(12) United States Patent
Viot et al.

(10) Patent No.: US 10,189,970 B2
(45) Date of Patent: Jan. 29, 2019

(54) METHOD FOR GRANULATING POLYMERS AND PRODUCT PRODUCED BY THIS METHOD

(71) Applicants: Frederic Viot, Poncin (FR); Philippe Cassagnau, Millerie (FR); Valérie Massardier-Nageotte, Villeurbanne (FR); Flavien Melis, Corbas (FR)

(72) Inventors: Frederic Viot, Poncin (FR); Philippe Cassagnau, Millerie (FR); Valérie Massardier-Nageotte, Villeurbanne (FR); Flavien Melis, Corbas (FR)

(73) Assignees: COMPAGNIE PLASTIC OMNIUM, Lyons (FR); INSTITUT NATIONAL DES SCIENCES APPLIQUEES DE LYON, Villeurbanne (FR); UNIVERSITE CLAUDE BERNARD LYON 1, Villeurbanne (FR); UNIVERSITE JEAN MONNET SAINT ETIENNE, Saint-Etienne (FR); CENTRE NATIONAL DE LA RECHERCHE SCIENTIFIQUE (CNRS), Paris (FR)

( * ) Notice: Subject to any disclaimer, the term of this patent is extended or adjusted under 35 U.S.C. 154(b) by 681 days.

(21) Appl. No.: 14/438,137

(22) PCT Filed: Oct. 23, 2013

(86) PCT No.: PCT/FR2013/052544
§ 371 (c)(1),
(2) Date: Apr. 23, 2015

(87) PCT Pub. No.: WO2014/064389
PCT Pub. Date: May 1, 2014

(65) Prior Publication Data
US 2015/0267028 A1  Sep. 24, 2015

(30) Foreign Application Priority Data

Oct. 26, 2012 (FR) .................................... 12 60275
Oct. 30, 2012 (FR) .................................... 12 60331

(51) Int. Cl.
*C08J 11/06* (2006.01)
*B29B 17/02* (2006.01)
(Continued)

(52) U.S. Cl.
CPC ................. *C08J 11/06* (2013.01); *B29B 9/16* (2013.01); *B29B 17/02* (2013.01); *B29C 47/38* (2013.01);
(Continued)

(58) Field of Classification Search
CPC ..... B29B 17/02; B29B 2009/168; B29B 9/06; B29B 9/16; B29B 2017/0293;
(Continued)

(56) References Cited

U.S. PATENT DOCUMENTS 3,683,511 A * 8/1972 Johnson .................. B29B 13/06
34/333
5,424,013 A    6/1995 Lieberman
(Continued)

FOREIGN PATENT DOCUMENTS

CN    1424957 A    6/2003
CN    101204837 A   6/2008
(Continued)

OTHER PUBLICATIONS

DE 196 51 571 A1 Derwent Abstract. Jun. 18, 1998.*
Machine translation of DE 196 51 571, NAAR et al, Jun. 18, 1998.*
Déclarations environnementales : Guide pour l'industrie et les Publicitaires, published 2008, ISBN 978-1-55491-010-6; Canadian Publication (no Translation available).
Standard NF ISO 16000-6, published May 5, 2005, French Publication (no Translation available).
(Continued)

*Primary Examiner* — Frances Tischler
(74) *Attorney, Agent, or Firm* — Jacox, Meckstroth & Jenkins

(57) ABSTRACT

A granulation method that can be used to obtain a polymer from "post-consumer" materials, and a motor vehicle part made from polymers produced by recycling used polymers.

12 Claims, 3 Drawing Sheets

(51) Int. Cl.
  *C08J 3/12* (2006.01)
  *B29C 47/38* (2006.01)
  *B29B 9/16* (2006.01)
  *C08J 11/08* (2006.01)
  *B29B 9/06* (2006.01)
  *B29L 31/30* (2006.01)
  *B29K 105/26* (2006.01)

(52) U.S. Cl.
  CPC .............. *C08J 3/12* (2013.01); *C08J 11/08* (2013.01); *B29B 9/06* (2013.01); *B29B 2009/168* (2013.01); *B29B 2017/0293* (2013.01); *B29K 2105/26* (2013.01); *B29L 2031/3044* (2013.01); *C08J 2300/30* (2013.01); *C08J 2323/12* (2013.01); *Y02W 30/622* (2015.05); *Y02W 30/701* (2015.05); *Y10T 428/254* (2015.01)

(58) Field of Classification Search
  CPC ............... B29C 47/38; B29K 2105/26; B29L 2031/3044; C08J 11/06; C08J 11/08; C08J 2300/30; C08J 2323/12; C08J 3/12; Y02W 30/622; Y02W 30/701; Y10T 428/254
  See application file for complete search history.

(56) References Cited

U.S. PATENT DOCUMENTS

| | | |
|---|---|---|
| 6,670,404 B2 | 12/2003 | Martel et al. |
| 6,919,383 B2 | 7/2005 | Khan et al. |
| 2002/0002208 A1 | 1/2002 | Martel et al. |
| 2002/0169223 A1 | 11/2002 | Khan et al. |
| 2004/0171707 A1 | 9/2004 | Martel et al. |
| 2005/0209354 A1 | 9/2005 | Martel et al. |
| 2007/0155843 A1 | 7/2007 | Martel et al. |

FOREIGN PATENT DOCUMENTS

| | | |
|---|---|---|
| CN | 101863091 A | 10/2010 |
| DE | 4207370 A1 | 9/1993 |
| DE | 19651571 A1 | 6/1998 |

OTHER PUBLICATIONS

Decree No. 2006-623, published May 29, 2006 in the Journal Officiel De La République Française, French Publication (no Translation available).

Directive 1999/13/EC of the European Council, published Mar. 11, 1999, French Publication (no Translation available).

* cited by examiner

METHOD FOR GRANULATING POLYMERS AND PRODUCT PRODUCED BY THIS METHOD

CROSS-REFERENCE TO RELATED APPLICATIONS

This application is the U.S. National Phase application of PCT Application No. PCT/FR2013/052544 filed Oct. 23, 2013, which claims priority to the French application 1260275 filed on Oct. 26, 2012, and to French application 1260331 filed on Oct. 30, 2012, which applications are incorporated herein by reference and made a part hereof.

BACKGROUND OF THE INVENTION

1. Field of the Invention

This invention relates to a method for granulating a polymeric material.

2. Description of the Related Art

A "post-consumer" material, as defined in article 7.8.1.1 of ISO 14021 ("Environmental labels and declarations—Self-declared environmental claims (Type II environmental labelling)"), is a "material generated by households or by commercial, industrial and institutional facilities in their role as end-users of the product, which can no longer be used for its intended purpose. This includes returns of material from the distribution chain". This type of material is different from a "pre-consumer" material as defined in the same article of the standard, i.e. a "material diverted from the manufacturing waste stream".

To date, the polymers obtained from "post-consumer" materials could not be used to manufacture coated parts, not accepting appearance faults, or at least not at high concentrations.

The invention solves this problem.

SUMMARY OF THE INVENTION

To this end, the invention relates to a method for granulating polymers from ground "post-consumer" materials, wherein it comprises a step for extracting volatile organic compounds and/or dissolved salts and/or small unmelted clusters present within the polymers.

The granulation method is implemented after sorting, grinding, separation, washing, drying, and other steps, already known for the recycling of plastics. The ground materials resulting from the previous steps are introduced in an extruder where they are mixed and melted, coming out as granules ready for use in the manufacture of parts containing recycled plastic.

This type of method reduces, in polymers obtained from "post-consumer" materials, the presence of pollutants such as volatile organic compounds (VOCs), dissolved salts and small unmelted clusters, which the inventors have seen to cause appearance faults in parts manufactured from these polymers.

At least three texts define volatile organic compounds.

Directive 1999/13/EC of the European Council of Mar. 11, 1999 on the limitation of emissions of volatile organic compounds due to the use of organic solvents in some activities and facilities defines a volatile organic compound as "any organic compound having, at 293.15 K, a vapor pressure of 0.01 kPa or more, or having a corresponding volatility under the particular conditions of use".

Decree No. 2006-623 of May 29, 2006, on the limitation of emissions of volatile organic compounds due to the use of organic solvents in some paints and varnishes and vehicle refinishing products, defines a volatile organic compound as "any organic compound having an initial boiling point, measured at a standard pressure of 101.3 kPa, is less than or equal to 250° C.".

Standard NF ISO 16000-6 of May 5, 2005 defines volatile organic compounds according to their boiling point and distinguishes, according to the classification adopted by the World Health Organisation in 1989, semi-volatile organic compounds whose boiling point is between (240° C. to 260° C.) and (380° C. to 400° C.), volatile organic compounds whose boiling point is between (50° C. to 100° C.) and (240° C. to 260° C.) and very volatile organic compounds whose boiling point is between <0° C. and (50° C. to 100° C.). The volatile organic compounds of this invention may be any of the semi-volatile organic compounds, volatile organic compounds and very volatile organic compounds defined in this standard.

In this invention, a volatile organic compound is taken to mean a compound which falls within a definition of at least one of these three texts.

The volatile organic compounds which are to be extracted according to this invention may be alkanes or alkenes, in particular oligomers of type alkanes or alkenes. They may be fatty acid esters, silicones or mineral oils from engine oils.

These pollutants are not present in virgin polymers (i.e., not produced by recycling) but are produced during the life of the polymer under the action of degradation due to aging, temperature, light and external pollutions such as engine oils or contaminations of any kind. They are present not only on the surface but also within the polymer to be recycled, trapped and/or dissolved in the entanglement of the polymer chains. This explains why simply washing the ground materials is not sufficient to remove them and why extraction is required.

Furthermore, the inventors have discovered that the passage, in paint lines, of parts with a high concentration of polymers obtained from "post-consumer" materials pollutes the paint line. They observed in fact that after the passage of such parts, any subsequent part made of virgin material, passing in the paint line, has appearance faults. The invention overcomes this disadvantage by protecting the paint line from this pollution.

Preferably, the extraction step takes place by addition of a fluid or mixture of fluids in an extruder which solubilizes them and/or entrains them, the pollutants so extracted being evacuated under atmospheric pressure or under vacuum during extrusion, before passing into an extrusion head.

The fluid used for the extraction is therefore highly effective. Since extraction takes place at the extrusion temperature, while the polymer to be recycled is molten, the impurities initially trapped inside are not necessarily molten. They can therefore be brought into contact with the fluid or mixture of fluids and be entrained. Furthermore, at this temperature, thermal agitation increases and, under the combined action of thermal agitation and the extruder mixing components, the probability of impurity molecules meeting the solvent increases, which simplifies entrainment of the impurities by the solvent In addition, this depollution method is generally very efficient since it occurs at the end of the recycling process. Some of the recycling steps may in fact generate pollutants. Since extraction takes place at the end of the recycling process, it concerns the pollutants already present in the polymer to be recycled as well as any pollutants generated during recycling.

It is also a method which does not require the purchase of additional equipment, nor implementation of an additional step, since extraction takes place in the extruder during granulation.

Lastly, the fluid can be easily recycled. At the extruder outlet, when the temperature of the fluid and the entrained pollutants is less than the extruder temperature, the pollutants precipitate or settle.

Advantageously, the fluid is water or a mixture containing water, introduced into the extruder at a pressure greater than that present in the extruder.

The pressure in the extruder is generally greater than 1.5 bar.

Preferably, water is added in the following proportions:
when the material to be extruded contains up to 0.4% by weight of volatile organic compounds: from 30 g of water per kg of extruded material;
when the material to be extruded contains more than 0.4% and up to 0.55% by weight of volatile organic compounds: from 50 g of water per kg of extruded material;
when the material to be extruded contains more than 0.55% and up to 0.7% by weight of volatile organic compounds: from 60 g of water per kg of extruded material.

As an alternative, the fluid is liquid carbon dioxide, liquid nitrogen, acetone, alcohol, and more specifically methanol, ethanol or butanol, or a mixture containing at least one of these fluids.

Optionally, the fluid or mixture of fluids is added last, including after any additives.

Advantageously, the fluid or mixture of fluids is added in the second half of the length of the extruder, preferably about two thirds of the way along the extruder.

Preferably, the volatile organic compounds to be extracted are molecules of molar mass less than 400 g/mol. Advantageously, the polymers to be granulated are polyolefins (homopolymers or copolymers of olefins), and preferably polypropylene.

The invention also relates to a method for recycling polymers from "post-consumer" materials, wherein it comprises a granulation step as defined above.

The invention also relates to a material obtained from the method described above. The invention also relates to a part manufactured in this material.

This invention also concerns a part for a motor vehicle made from polymers produced by recycling polymers obtained from "post-consumer" materials.

Parts for motor vehicles made of polymers obtained from "post-consumer" materials are known in the state of the art. Traditionally, however, the use of these polymers is limited to the manufacture of structural parts, or at least hidden parts, or without coating, or at least having no appearance requirements.

However, the use of such polymers for the manufacture of visible parts, visible within the meaning of the definition of Directive 98/71/EC of the European Parliament and of the Council of Oct. 13, 1998 on the legal protection of designs or models, namely that "the part is visible during normal use, i.e. use by the end user, excluding maintenance, servicing or repair work", the parts having appearance requirements are faced, when used at high contents, with problems of appearance faults when these parts are painted or covered with another coating.

Such use of polymers obtained from "post-consumer" materials, if it was to increase, would reduce the production cost for these parts.

Moreover, this new destination for recycled polymers would increase the overall volumes of recycled plastics and therefore draw more significantly from the benefits of recycling plastics, namely limitation of the use of natural resources such as fossil fuels and reduction of the volume of plastic waste, poorly degradable and responsible for pollution.

One object of this invention is therefore to provide parts for motor vehicles, made from polymers obtained from "post-consumer" materials.

Thus, the invention relates to a motor vehicle part having, after coating with paint, varnish, chromium or a decorative film, the following appearance requirements:
gloss under incident angle of 20° of between 65% and 90% reflected light,
a maximum of 4 faults of type grains, craters, or particles per m², of size greater than 50 μm.
resistance to external aggression defined by no peeling after adhesion test under each of the following conditions:
in the initial state,
after the part has been immersed in demineralized water at 40° C. for 10 days or 60° C. for 3 days, the resistance to external aggression test being carried out 1 hour after taking out and wiping the part,
and after exposure at a temperature of 85° C. for 7 days, the resistance to external aggression test being carried out after cooling to room temperature, and
peeling of the paint film less than 2 cm² over the entire part, after the part has been given at least five X-cuts down to the substrate each inside a square of side 10 cm and has then been subjected for 30 seconds to a water jet at 85° C. at a pressure of 65 bar from a flat nozzle of a high-pressure cleaner positioned 10 cm from the part, the peeling of each cross not exceeding 1 cm²,
the part being made of polymers, some of which are obtained from ground "post-consumer" materials, wherein the percentage by weight of polymers obtained from ground "post-consumer" materials is greater than or equal to 30, or preferably greater than or equal to 50, or still more preferably equal to 100.

The appearance requirements are measured as follows:

Gloss is measured using a glossmeter of type Byk Gardner Microgloss 20° or Microtrigloss, Labomat Essor REFO 3 or Minolta Multigloss 268, under the conditions of use indicated by the manufacturer. The calibration standard is an opaque black glass plate with one side flat and polished, of minimum thickness 5 mm, and is accompanied by its own gloss values for the angle of 20°, certified by organizations such as the National Research Council (NRC Canada) and the Bundesanstalt fur Materialforschung und-prüfung (BAM Germany). The surface to be measured is prepared by washing with soapy water or a suitable product which does not damage the surface, rinsed, wiped and dried. The measurement is taken in an area away from direct lighting. It is taken at 4 points on the surface, in different directions; the measurement points farthest apart must not be more than 100 mm away from each other. In case of curved surfaces, the glossmeter can be pivoted slightly to obtain the maximum value of the point considered, which will be the value recorded for this point.

We consider the substrate which is the bare bodywork part on which the coating is applied and the film which is the continuous covering resulting from application on the substrate of one or more coating layers (generally the primer, the base and the varnish). To evaluate the resistance to external aggression, the paint film is cut through to the substrate to form a grid and the adhesion of the squares in the lattice is assessed. The tests are conducted in a room at a temperature between 21° C. and 25° C. The test must be conducted in three different locations of the specimen. Six parallel cuts are made, followed by six cuts crossing the initial cuts at 90°. The spacing of the cuts must be as follows:

- 1 mm for a single-coat or unprimed lacquer,
- 2 mm for a primer, a base and a varnish,
- 1 mm for the inner parts whose coating thickness is less than 60 μm,
- 2 mm for the inner parts whose coating thickness is greater than or equal to 60 μm.

The specimen is then lightly brushed. Adhesive tape of adhesivity between 600 g/cm and 750 g/cm (according to standard NF EN 1939) is then applied. The center of the adhesive tape is placed on the grid, parallel to one of the cut directions, and is pressed on and around the grid and over a length of at least 20 mm, smoothing it with the rounded edge of a piece of wood. The adhesion time is at least one minute.

Within five minutes after applying the adhesive tape, it is removed by taking the free end and pulling it off rapidly, within 0.5 to 1 second, at an angle as close as possible to 60°.

The manufacture of such parts will increase the proportion of polymers obtained from "post-consumer" materials in the motor vehicle parts.

The inventors have in fact observed that in coated parts using 30% or more of polymers obtained from "post-consumer" materials, appearance faults due to the presence of foreign bodies, flakes and unmelted clusters are detected. In particular, the following appearance faults are defined:

- grains are faults due to small dust particles found on the surface of the injected polymer which either remain on the surface of the substrate, or are deposited between two successive coats of the film, creating an appearance fault by deformation thereof, or are deposited on the last coat of the paint film,
- craters are fault due to a local reduction in the thickness of the paint film; this reduction is due to pollution on the surface of the substrate which changes the surface tension of the polymer and prevents the paint from spreading correctly,
- particles are due to the presence of solid impurities which are incompatible with the injected polymer and create appearance faults by deformation of the substrate surface and therefore of the paint film.

Table 1 shows the effect of the percentage of polymers obtained from ground "post-consumer" materials on the appearance of motor vehicle parts. It also shows the effect of the treatment by the granulation method on the appearance of these parts. These appearance data represent a summary of the values obtained over several hundred polypropylene motor vehicle parts. All the appearance data measurements were taken according to the methods described above.

TABLE 1

| Material | Gloss (percentage of light reflected under incident angle of 20°) | Number of faults (grains, craters, particles) of area less than 1 mm²/m² | Total area peeled off over the set of 5 crosses | Largest area peeled off on one cross | Peeling after adhesion test Initial state | Peeling after adhesion test Immersion in water | Peeling after adhesion test Exposure to heat | High-pressure cleaner Pollution of the paint line |
|---|---|---|---|---|---|---|---|---|
| 30% recycled polypropylene, non treated | 65 to 85 | >4 | 5 cm2 | 4 cm2 | No | No | No | Yes |
| 30% recycled polypropylene, treated | >85 | <4 | <2 cm2 | 1 cm2 | No | No | No | No |
| 100% recycled polypropylene, non treated | 65 to 85 | >4 | 10 cm2 | 7 cm2 | Yes | Yes | No | Yes |
| 100% recycled polypropylene, treated | >85 | <4 | <2 cm2 | 1 cm2 | No | No | No | No |

The first row shows the appearance data of parts containing 30% recycled polypropylene, i.e. obtained from ground "post-consumer" materials which have not undergone extraction of pollutants according to the invention. In this example, the gloss and resistance to external aggression (peeling after adhesion test) data comply with the appearance requirements to be achieved with the invention. In contrast, the density of faults (grains, craters, or particles) is greater than the accepted density (more than 4 defaults/m²) and peeling of the paint film after the part has been subjected to a high-pressure cleaner is greater than the accepted peeling, in peeled area on all crosses and in peeled area on at least one of the crosses. We also observe that the paint line is polluted.

These results are different from those obtained for other parts (row 2) also containing 30% recycled polypropylene having undergone extraction of pollutants according to the invention. The appearance data recorded for these parts comply with the appearance requirements to be achieved with the invention. In addition, the passage of these parts on the paint line did not pollute the line.

The third row shows the appearance data of parts made entirely of recycled polypropylene not having undergone extraction of pollutants according to the invention. In this example, the appearance data do not comply with the appearance requirements to be achieved with the invention. Lastly, the paint line is polluted after passage of these parts.

In contrast, the appearance data recorded for parts (row 4) made entirely of recycled polypropylene having undergone extraction of pollutants according to the invention comply with the appearance requirements to be achieved. In addition, the passage of these parts on the paint line did not pollute the line.

Table 2 shows the effect of the quantity of water used in extraction of pollutants according to the invention on the appearance of motor vehicle parts. These appearance data represent a summary of the values obtained over several hundred polypropylene motor vehicle parts. All the appearance data measurements were taken according to the methods described above.

TABLE 2

| Material | Gloss (percentage of light reflected under incident angle of 20°) | Number of faults (grains, craters, particles) of area less than 1 mm²/m² | High-pressure cleaner | | Peeling after adhesion test | | | Pollution of the paint line |
| --- | --- | --- | --- | --- | --- | --- | --- | --- |
| | | | Total area peeled off over the set of 5 crosses | Largest area peeled off on one cross | Initial state | Immersion in water | Exposure to heat | |
| 30% recycled polypropylene containing 0.70% of VOCs treated with 60 g of water per kg of extruded material | 65 to 85 | <4 | <2 cm2 | 1 cm2 | No | No | No | No |
| 30% recycled polypropylene containing 0.70% of VOCs treated with 59 g of water per kg of extruded material | 65 to 85 | >4 | <3 cm2 | 1 cm2 | No | No | No | No |
| 30% recycled polypropylene containing 0.55% of VOCs treated with 50 g of water per kg of extruded material | 65 to 85 | <4 | <2 cm2 | 1 cm2 | No | No | No | No |
| 30% recycled polypropylene containing 0.55% of VOCs treated with 49 g of water per kg of extruded material | 65 to 85 | >4 | <3 cm2 | 1.5 cm2 | Yes | Yes | Yes | No |
| 30% recycled polypropylene containing 0.40% of VOCs treated with 30 g of water per kg of extruded material | 65 to 85 | <4 | <2 cm2 | 1 cm2 | No | No | No | No |
| 30% recycled polypropylene containing 0.40% of VOCs treated with 29 g of water per kg of extruded material | 65 to 85 | >4 | <4 cm2 | 2.5 cm2 | No | Yes | Yes | Yes |

The appearance data of motor vehicle parts made using 30% recycled polypropylene were recorded. The data vary depending on the quantity of water added to the extruder for extraction of pollutants according to the invention. Moreover, the quantity of water required varies according to the percentage of VOCs in the material to be extruded. On the first row, therefore, treatment with 60 g of water per kg of recycled polypropylene material containing 0.70% VOCs can be used to obtain appearance data complying with the appearance requirements to be achieved. Furthermore passage of these parts on the paint line does not pollute the line. In contrast, on the second row, treatment with 59 g of water per kg of recycled polypropylene material containing 0.70% VOCs does not achieve the appearance requirements in terms of fault density and peeling of the paint film after the part has been subjected to a high-pressure cleaner. Similarly, while on rows 3 and 5 (respectively recycled polypropylene containing 0.55% of VOCs treated with 50 g of water per kg of extruded material and recycled polypropylene containing 0.40% VOCs treated with 30 g of water per kg of extruded material), the appearance data comply with the appearance requirements to be achieved, on rows 4 and 6, which have the same VOC percentages, the appearance data of parts in which the recycled polypropylene has been treated with a smaller quantity of water do not comply. On these two rows, in fact, the number of faults, the resistance of the paint film after being subjected to the high-pressure cleaner and the resistance to external aggressions differ from the accepted values. Moreover, on row 6, the paint line is polluted after passage of the parts.

In particular, the maximum fault density accepted in the appearance areas of visible parts is 3 faults per m2.

The appearance areas are those of the visible sides of parts visible by an observer of adult height standing beside the vehicle, which are characterized in that they have a flat or convex surface with a radius of curvature greater than 500 mm.

Optionally, the part is a bodywork part.

These and other objects and advantages of the invention will be apparent from the following description, the accompanying drawings and the appended claims.

BRIEF DESCRIPTION OF THE ACCOMPANYING DRAWINGS

The invention will be better understood on reading the description which follows, given purely by way of non-limiting example and with reference to the drawings wherein:

FIG. 5 is an enlarged sectional view of a crater type fault;

FIG. 6 is an enlarged sectional view of a particle type fault; and

FIG. 7 is an enlarged sectional view of a grain type fault.

DETAILED DESCRIPTION OF THE PREFERRED EMBODIMENTS

Figure 1:
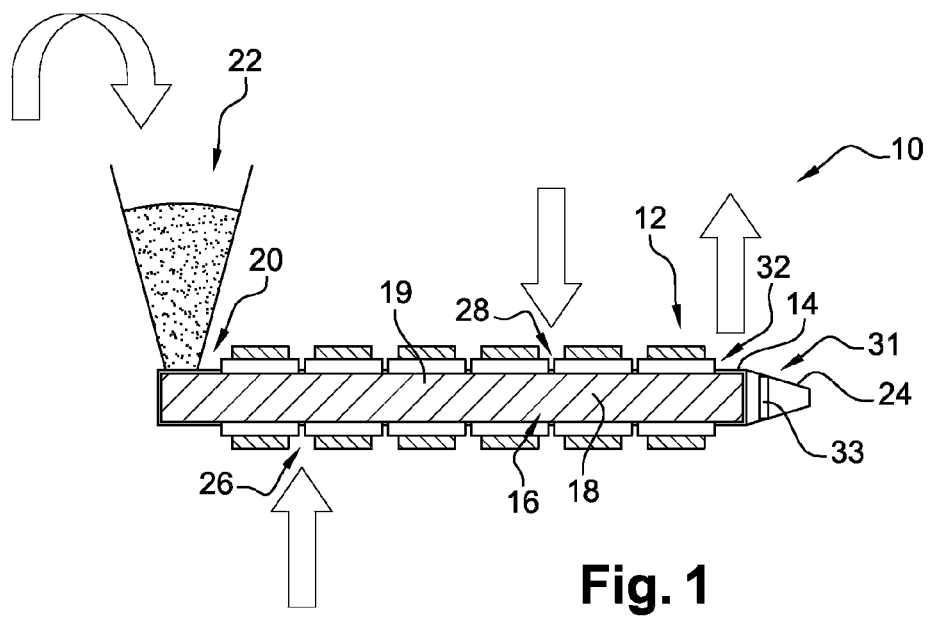
FIG. 1 is a schematic representation of a device according to the invention.

FIG. 1 shows an extrusion device according to the invention, designated by the general reference 10. The features and method of the invention described earlier are incorporated herein.

The device 10 forms an extruder and comprises a stator 12 forming a barrel 14 and a rotor 16 forming a worm screw 18 (single or twin screw) system. The screw 18 is rotatable in the barrel 14. The barrel 14 and the screw 18 define an annular space 19 in which a composition to be extruded is driven forward.

The device 10 comprises a main upstream inlet 20 adapted for the introduction of compounds, in this case the ground materials and possibly some additives conventionally added during extrusion, such as oxidants. The device 10 comprises a hopper 22 for the introduction of ground materials and additives in the main upstream inlet 20. The device 10 also comprises an outlet 31 provided with an extrusion head 24 equipped with a die 33.

The device 10 comprises a first intermediate inlet 26 arranged just downstream from the main upstream inlet 20. The first intermediate inlet 26 is adapted for the introduction of an additive.

The device 10 also comprises a second intermediate inlet 28 arranged downstream from the main upstream inlet 20 and from the main intermediate inlet 26. The second intermediate inlet 28 is adapted for the introduction of pressurized water.

Lastly, the device 10 comprises an outlet 32 leading to a vacuum pump adapted to evacuate the mixture of water and pollutants extracted during extrusion.

Figure 2:
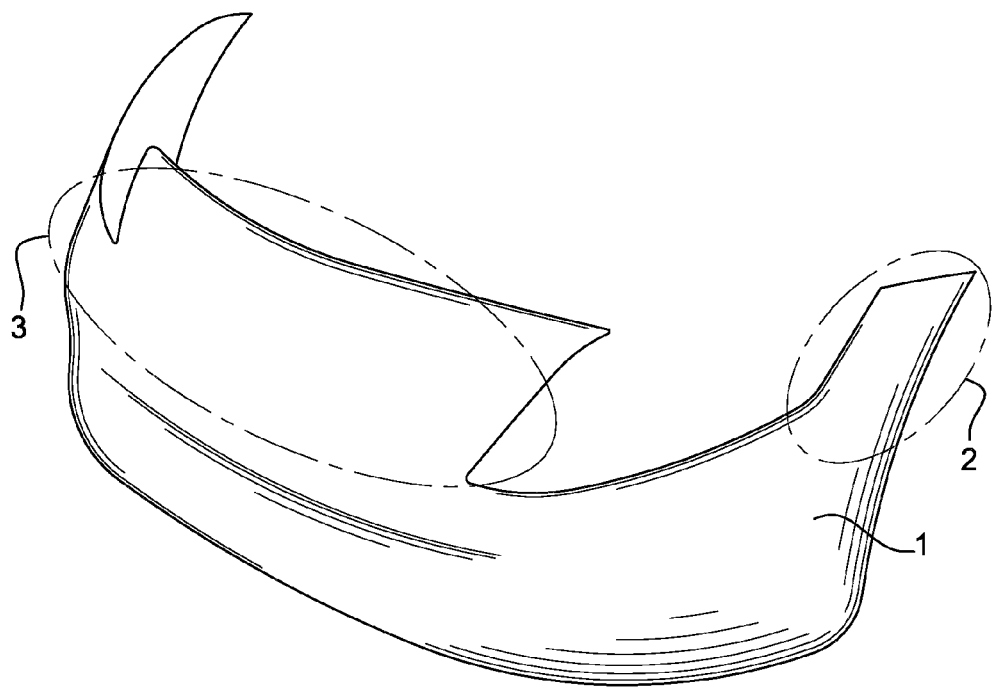
FIG. 2 is a front view in perspective of a front bumper of a motor vehicle.

FIG. 2 is a perspective view of a front bumper 1 of a motor vehicle. Areas 2 and 3 correspond to the appearance areas of the bumper 1.

Figure 3:
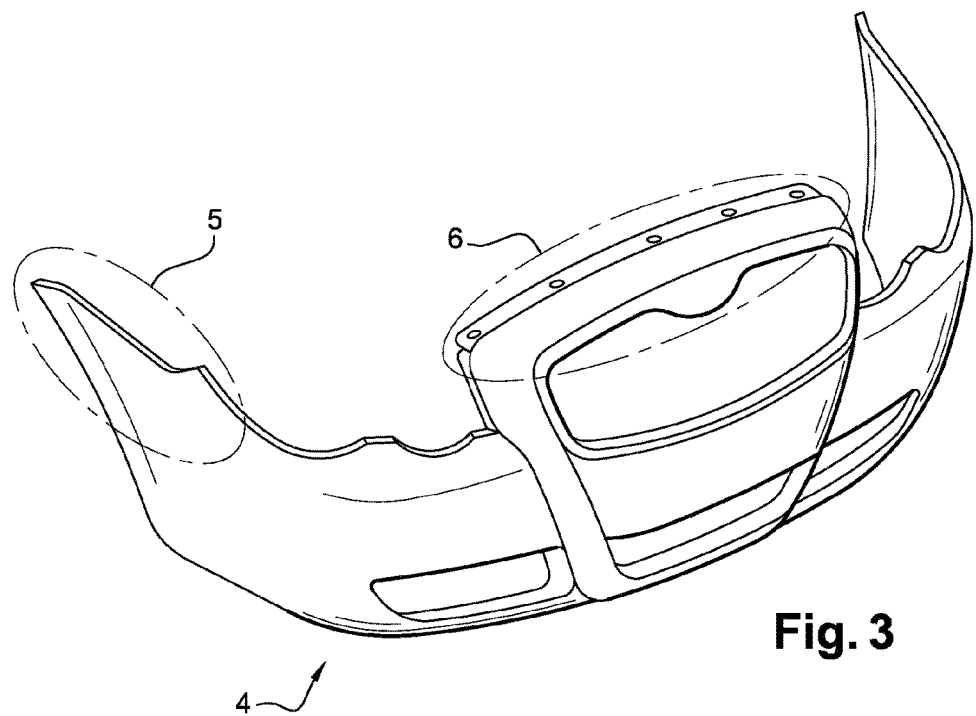
FIG. 3 is a front view in perspective of a front bumper of a motor vehicle.

FIG. 3 is a perspective view of a front bumper 4 of a motor vehicle. Areas 5 and 6 correspond to the appearance areas of the bumper 4.

Figure 4:
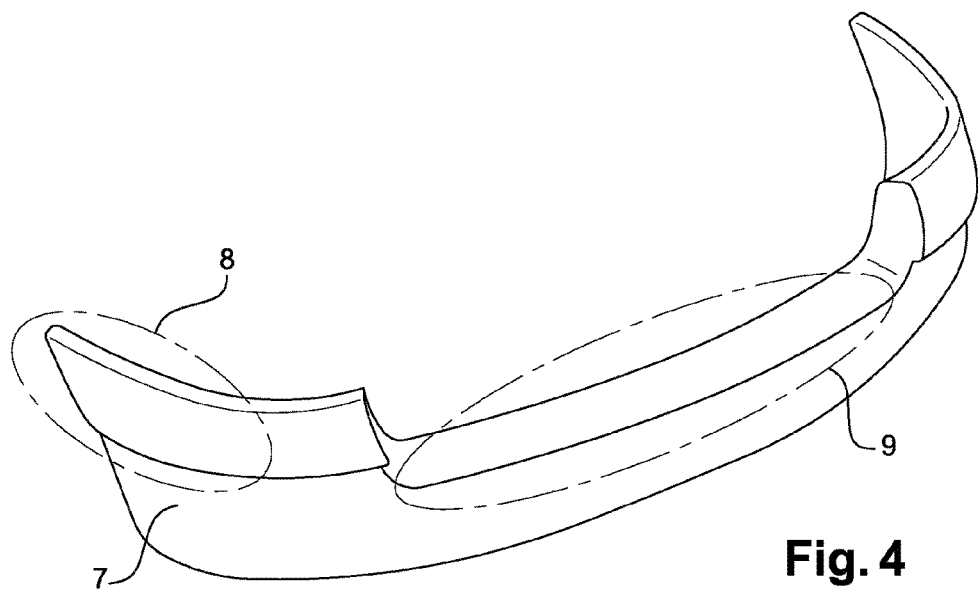
FIG. 4 is a front view in perspective of a rear bumper of a motor vehicle.

FIG. 4 is a perspective view of a rear bumper 7 of a motor vehicle. Areas 8 and 9 correspond to the appearance areas of the bumper 7.

Areas 1 to 6 correspond to the appearance areas of the bumpers.

Figure 5:
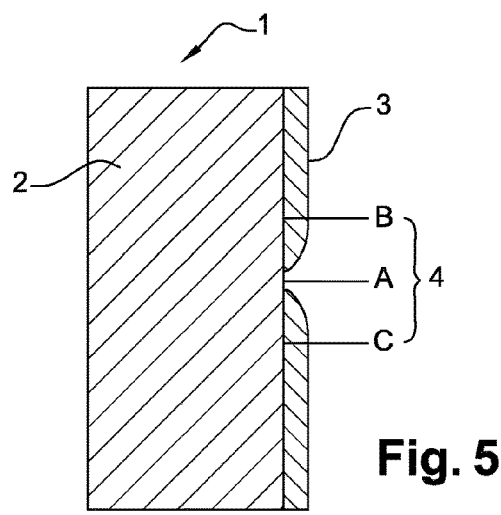
FIGS. 5 to 7 are representations of appearance faults.

FIG. 5 is a sectional view enlarged at a scale of 30:1 of an outer portion of a painted bodywork part 1 consisting of a substrate 2 and a paint film 3. The thickness of the paint film 3 varies between points B and C, where it is equal to 100 µm. It is equal to 0 µm at point A. In contrast, outside the segment [BC], the film thickness is constant. The portion of the paint film 3 located between points B and C, extending over a length of 0.6 mm, is a schematic representation of a crater type fault 4.

Figure 6:
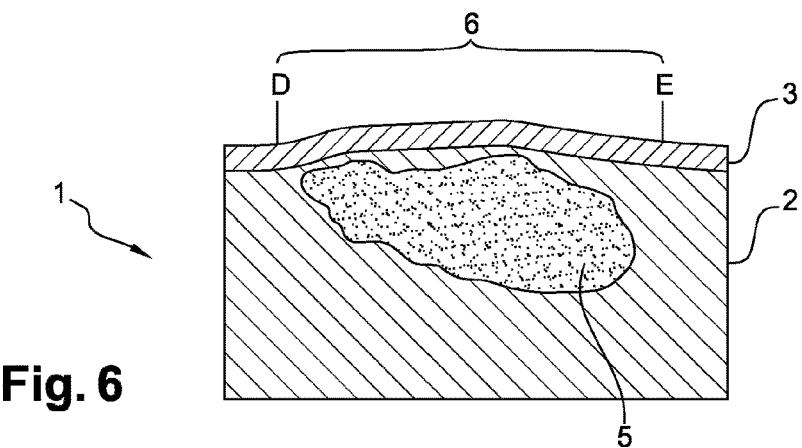

FIG. 6 shows a sectional view enlarged at a scale of 30:1 of an outer portion of a painted bodywork part 1 consisting of a substrate 2 and a paint film 3. The substrate 2 of this figure, unlike that of FIG. 5, does not have a straight surface. Its surface appears to be convex in the portion extending from point D to point E located next to an impurity 5. The portion of the paint film 3 extending from point E to point F, over a length of 1.8 mm, is deformed. It is a schematic representation of a particle type fault 6.

Figure 7:
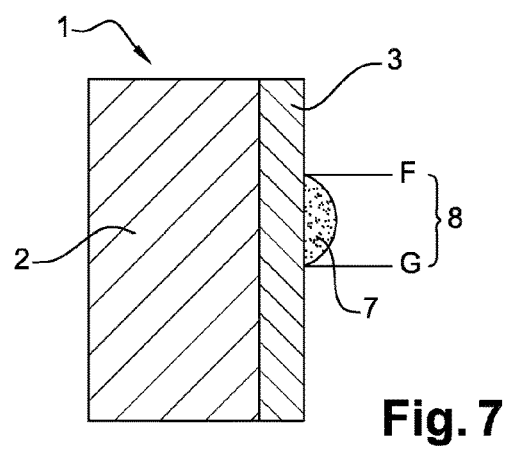

FIG. 7 shows a sectional view enlarged at a scale of 75:1 of an outer portion of a painted bodywork part 1 consisting of a substrate 2 and a paint film 3. The paint film has a constant thickness of 93 µm. A dust particle 7 is deposited on the last coat of the paint film. This fault, extending from points F to G over a length of 0.2 mm, is a schematic representation of a grain type fault 8. The other causes of grain type faults, namely the presence of a dust particle on the substrate surface or between two successive coats of the paint film, creating an appearance fault by deformation of the paint film, are not shown.

The method is not limited to the embodiments described above.

Volatile organic compounds, dissolved salts and/or small unmelted clusters can in fact be extracted through the use of a fluid other than water or a mixture of fluids.

Also, the granulation method can be used to manufacture parts other than bodywork parts for motor vehicles and even parts for sectors other than the automotive sector.

Lastly, the granulation method can be applied to polymers other than polypropylene.

While the process and method herein described constitute preferred embodiments of this invention, it is to be understood that the invention is not limited to this precise process and method, and that changes may be made therein without departing from the scope of the invention which is defined in the appended claims.

What is claimed is:

1. A method for granulating polymers from ground post-consumer materials, wherein said method comprises a step of:
   extracting dissolved salts and/or small unmelted clusters present within said polymers;
   wherein said extracting step comprises the step of adding a fluid or mixture of fluids in an extruder which solubilizes said dissolved salts and/or small unmelted clusters or entrains them, at least one of said dissolved salts and/or small unmelted clusters so extracted being evacuated under atmospheric pressure or under vacuum during extrusion before passing into an extrusion head;
   wherein said fluid is at least one of water or a mixture containing water, introduced into said extruder at a pressure greater than that present in said extruder;
   wherein 60 g of water or more is added per kg of extruded material; and
   wherein said method further comprises a step of granulating said polymers after passing through a die of said extrusion head;
   wherein said method is used to extrude a polymer that is used for molding a part, that, after coating, has a maximum in the appearance areas of visible parts of 4 faults of type grains, craters, or particles, per $m^2$, of size greater than 50 µm.

2. The method for granulating according to claim 1, wherein said fluid is a mixture comprising at least one of liquid carbon dioxide, liquid nitrogen, acetone, alcohol.

3. The method for granulating according to claim 1, wherein said fluid or said mixture of fluids is added last, including after any additives.

4. The method for granulating according to claim 3, said fluid or said mixture of fluids being added in the second half of the length of the extruder, about two thirds of the way along said extruder.

5. The method for granulating according to claim 1, wherein said polymers to be granulated are polyolefins, which are chosen from homopolymers or copolymers of olefins.

6. The method for granulating according to claim 2, wherein said fluid or said mixture of fluids is added last, including after any additives.

7. The method for granulating according to claim 3, wherein said polymers to be granulated are polyolefins which are chosen from homopolymers or copolymers of olefins.

8. The method for granulating according to claim 2, wherein said polymers to be granulated are polyolefins which are chosen from homopolymers or copolymers of olefins.

9. The method for granulating according to claim 2, wherein the alcohol is selected from methanol, ethanol and butanol.

10. The method for granulating according to claim 5, wherein said polyolefin is polypropylene.

11. The method for granulating according to claim 7, wherein said polyolefin is polypropylene.

12. The method for granulating according to claim 8, wherein said polyolefin is polypropylene.

\* \* \* \* \*

UNITED STATES PATENT AND TRADEMARK OFFICE
CERTIFICATE OF CORRECTION

PATENT NO. : 10,189,970 B2
APPLICATION NO. : 14/438137
DATED : January 29, 2019
INVENTOR(S) : Viot et al.

Page 1 of 1

It is certified that error appears in the above-identified patent and that said Letters Patent is hereby corrected as shown below:

On the Title Page

Item [73], delete "Lyons" and insert --Lyon-- therefor.

In the Claims

Column 10, Line 43, Claim 2, insert --or-- after "acetone,".

Signed and Sealed this
Fifth Day of March, 2019

Andrei Iancu
*Director of the United States Patent and Trademark Office*